(12) United States Patent
Kowalevicz et al.

(10) Patent No.: US 10,243,670 B2
(45) Date of Patent: Mar. 26, 2019

(54) OPTICAL SIGNAL PROCESSING USING AN OPTICAL RESONATOR

(71) Applicant: RAYTHEON COMPANY, Waltham, MA (US)

(72) Inventors: Andrew Kowalevicz, Arlington, VA (US); Gary M. Graceffo, Burke, VA (US); Benjamin P. Dolgin, Alexandria, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 15/816,529

(22) Filed: Nov. 17, 2017

(65) Prior Publication Data

US 2018/0145765 A1 May 24, 2018

Related U.S. Application Data

(60) Provisional application No. 62/424,089, filed on Nov. 18, 2016.

(51) Int. Cl.
*H04B 10/06* (2006.01)
*H04B 10/61* (2013.01)
(Continued)

(52) U.S. Cl.
CPC ......... *H04B 10/615* (2013.01); *H04B 10/676* (2013.01); *G02B 17/004* (2013.01); *H04B 10/54* (2013.01)

(58) Field of Classification Search
CPC .... H04B 10/60; H04B 10/671; H04B 10/672; H04B 10/697; H04B 10/677;
(Continued)

(56) References Cited

U.S. PATENT DOCUMENTS 8,411,351 B2  4/2013 McCallion et al.
8,693,875 B2 * 4/2014 Banwell ........... H04B 10/25759
                                                          398/115

(Continued)

FOREIGN PATENT DOCUMENTS

JP         H0591047 A      4/1993

OTHER PUBLICATIONS

Arimoto et al., "High-speed free-space laser communication", Performance and Management of Complex Communications Networks, 1998, pp. 175-190.

(Continued)

*Primary Examiner* — Hanh Phan
(74) *Attorney, Agent, or Firm* — Lando & Anastasi, LLP

(57) ABSTRACT

Aspects are generally directed to optical signal receivers and methods. In one example, a receiver includes a pump assembly configured to produce an encoded pump signal. The receiver includes an optical resonator positioned to receive an optical signal and the encoded pump signal, the optical resonator including an optical medium to accumulate resonant optical signal energy based on the optical signal, and the optical resonator being configured to emit output optical signal energy and disturb the output optical signal energy in response to a variation in the optical signal, the optical medium being further configured to modify a waveform shape of the output optical signal energy based on the encoded pump signal. The receiver further includes a detector to detect the output optical signal energy and determine a characteristic of the variation in the optical signal based on the waveform shape of the output optical signal energy.

19 Claims, 9 Drawing Sheets

(51) Int. Cl.
*H04B 10/67* (2013.01)
*H04B 10/54* (2013.01)
*G02B 17/00* (2006.01)

(58) Field of Classification Search
CPC .... H04B 10/676; H04B 10/691; H04B 10/67; H01S 3/1305; H01S 3/1307
USPC ....... 398/202, 212, 208, 209, 210, 211, 213, 398/214, 158, 159, 183, 188, 115, 198, 398/135, 136
See application file for complete search history.

(56) References Cited

U.S. PATENT DOCUMENTS

| | | | |
|---|---|---|---|
| 2006/0013591 A1 | 1/2006 | Rohde | |
| 2007/0031150 A1 | 2/2007 | Fisher et al. | |
| 2008/0026300 A1 | 9/2008 | Mayer et al. | |
| 2008/0240736 A1* | 10/2008 | Ji | H04B 10/677 398/202 |
| 2008/0266573 A1 | 10/2008 | Choi et al. | |
| 2011/0097085 A1 | 4/2011 | Oda et al. | |
| 2012/0121271 A1 | 5/2012 | Wood | |
| 2012/0269523 A1* | 10/2012 | McCallion | H04B 10/677 398/202 |
| 2013/0272337 A1 | 10/2013 | Tan et al. | |
| 2014/0314406 A1 | 10/2014 | Zerbe et al. | |
| 2016/0013870 A1 | 1/2016 | Sorin et al. | |
| 2018/0054259 A1 | 2/2018 | Kowalevicz et al. | |
| 2018/0091227 A1* | 3/2018 | Dolgin | H04B 10/616 |
| 2018/0091228 A1 | 3/2018 | Kowalevicz et al. | |
| 2018/0091230 A1 | 3/2018 | Dolgin et al. | |
| 2018/0091232 A1* | 3/2018 | Dolgin | H04B 10/6931 |

OTHER PUBLICATIONS

Wright et al., "Adaptive optics correction into single mode fiber for a low Earth orbiting space to ground optical communication link using the OPALs downlink", Optics Express, vol. 23, Dec. 2015, pp. 1-8.

Andrews et al., "Final Report: Channel Characterization for Free-Space Optical Communications, Phase 0 testing at Hollister, CA, Phase 2 Final Testing at China Lake, CA", Jul 2012, pp. 1-60. Retrieved from <URL: http://www.dtic.mil/cgi-bin/GetTRDoc?Location=U2&doc=GetTRDoc.pdf&AD=ADA565323> and accessed on Nov. 17, 2017.

Juarez et al., "High-sensitivity DPSK receiver for high-bandwidth free-space optical communication links", Optics Express, vol. 19, May 2011, pp. 1-8.

Zhang, L. et al. "Microring-based Modulation and Demodulation of DPSK Signal" Optical Society of America, Optic Express, vol. 15, No. 18, Sep. 3, 2007.

Fang et al., "Multi-channel Silicon Photonic Receiver Based on Ring-resonators", Optics Express, vol. 18, No. 13, pp. 13510-13515, Jun. 21, 2010.

Xu et al., "Optical Differential-Phase-Shift-Keying Demodulation Using a Silicon Microring Resonator", IEEE Photonics Technology Letters, vol. 21, pp. 295-297, No. 5, Mar. 1, 2009.

* cited by examiner

OPTICAL SIGNAL PROCESSING USING AN OPTICAL RESONATOR

CROSS REFERENCE TO RELATED APPLICATION

This application claims priority under 35 U.S.C. § 119(e) to U.S. Provisional Application Ser. No. 62/424,089, titled "OPTICAL SIGNAL PROCESSING USING A FABRY-PEROT ETALON," filed on Nov. 18, 2016, which is hereby incorporated herein by reference in its entirety.

BACKGROUND

Many optical communication systems manipulate light waves to carry information. For instance, often a light source (e.g., a laser source) is modulated to change various properties of emitted light, such as an amplitude, phase, frequency, or wavelength of the light to convey information. In some cases, an underlying signal, such as a radio frequency signal, may be modulated via amplitude, phase, or frequency modulation, or any combination thereof, and the light source may be modulated by the underlying signal. Optical receivers receive the light waves and measure properties or variations of the light wave, from which the underlying signal and the information may be recovered.

Optical signals with phase modulation formats have several advantages over amplitude modulation formats. However, when compared to typical amplitude modulation receivers, phase modulation receivers can be significantly more complex. Some examples of phase modulation receivers may include local oscillators, Fiber Bragg Gratings (FBG), and delay line interferometers (DLI). Generally, a phase modulation receiver collects a phase-encoded optical signal and performs one or more demodulation processes to convert the phase modulation into useful information. For example, this information may include communication information encoded in the phase modulation by a transmitter, information encoded in the phase modulation through interaction of the optical signal with an object, or other information about the source of the optical signal, the optical channel through which it traveled, and/or objects with which it interacted.

SUMMARY

Aspects and examples described herein provide systems and methods for demodulation of optical signals without a locally coherent clock source. In particular, certain examples of the systems described herein include an optical signal receiver that includes an optical resonator having a controllable optical medium. The optical resonator is configured to receive an optical signal, establish a steady-state condition in which the received optical signal accumulates or adds to build-up resonating optical signal energy inside the optical resonator, and convert the received optical signal into an intensity-encoded optical signal. In many examples, the system includes a pump assembly coupled to the optical resonator to provide an encoded pump signal to the optical medium to modify a waveform shape of the intensity-encoded optical signal.

Examples of the described systems may detect information encoded in the optical signal based on the intensity-encoded optical signal. When compared to various known receivers, the described systems and methods increase the detectability of phase transitions in a received optical signal, among various other benefits. Moreover, the examples of the systems and methods may be tuned to the wavelength of an optical carrier signal and therefore function over a broad range of modulation rates without the need to modify the characteristics of the receiver. That is, the systems and methods disclosed herein may provide the flexibility to accommodate various encoding techniques.

According to an aspect, provided is an optical signal receiver. In one example, the optical signal receiver comprises a pump assembly including a pump source coupled to a pump modulator, the pump source being configured to a emit a pump signal, and the pump modulator being configured to encode a modulation waveform on the pump signal to produce an encoded pump signal, an optical resonator positioned to receive an optical signal and the encoded pump signal, the optical resonator including an optical medium to accumulate resonant optical signal energy inside the optical resonator based at least in part on the received optical signal, and the optical resonator being configured to emit output optical signal energy and to disturb the output optical signal energy in response to a variation in the received optical signal, and the optical medium being further configured to modify a waveform shape of the output optical signal energy based on the encoded pump signal, and a detector configured to detect the output optical signal energy and to determine a characteristic of the variation in the received optical signal based on the waveform shape of the output optical signal energy.

In various examples, the output optical signal energy is a convolution of the encoded pump signal and at least a portion of the resonant optical signal energy. In some examples, the disturbance in the output optical signal energy is a variation in an intensity of the output optical signal energy, and the waveform shape of the output optical signal energy is an intensity profile. In at least some examples, the optical medium is a gain medium configured to amplify the received optical signal, and the pump modulator is further configured to produce the encoded pump signal to modulate a gain of the gain medium to modify the intensity profile of the output optical signal energy. In a further example, the gain medium is formed from a non-linear crystal material or a semiconductor material.

According to various examples described herein, the pump source is a continuous-wave laser, and the pump assembly further includes a waveform generator configured to generate the modulation waveform. In various examples, the waveform generator is further configured to dynamically adjust the modulation waveform to alter the encoded pump signal. In some examples, the encoded pump signal is a pulsed pump signal.

According to various examples, the optical resonator is an etalon having a pair of semi-reflective surfaces configured to at least partially trap the resonant optical signal energy between the pair of semi-reflective surfaces by reflecting a portion of resonant optical signal energy between pair of semi-reflective surfaces, the optical medium being interposed between the pair of semi-reflective surfaces. In some examples, the optical resonator is configured to disturb the output optical signal energy in response to a variation in a phase of the received optical signal. In particular examples, the detector is further configured to identify the variation in the phase of the received optical signal based at least in part on the waveform shape of the output optical signal energy.

According to another aspect, provided is a method of operating an optical signal receiver. In one example, the method comprises encoding a modulation waveform on a pump signal to produce an encoded pump signal, receiving the encoded pump signal and an optical signal at an optical resonator, the optical resonator including an optical medium, resonating optical signal energy within the optical medium based at least in part on the received optical signal, emitting output optical signal energy from the optical resonator and disturbing the output optical signal energy in response to a variation in the received optical signal, where the encoded pump signal convolves with the resonating optical signal energy to modify a waveform shape of the output optical signal energy, and determining a characteristic of the variation in the received optical signal based at least in part on the waveform shape of the output optical signal energy.

In various examples, the disturbance in the output optical signal energy is a variation in an intensity of the output optical signal energy, and the waveform shape of the output optical signal energy is an intensity profile. In some examples, the method further comprises comprising amplifying the received optical signal at the optical medium. In various examples, the method further comprises modulating a gain of the optical medium with the encoded pump signal to modify the intensity profile of the output optical signal energy.

According to various examples described herein, the method further comprises generating the pump signal at a continuous-wave laser, generating the modulation waveform at a waveform generator, and dynamically adjusting the modulation waveform to alter the encoded pump signal. In some examples, encoded pump signal is a pulsed pump signal. In various examples, resonating optical signal energy within the optical medium includes trapping the optical signal energy between a pair of semi-reflective surfaces by reflecting a portion of optical signal energy between the pair of semi-reflective surfaces. In at least one example, the variation in the received optical signal is a variation in a phase of the received optical signal.

Still other aspects, examples, and advantages are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 1:
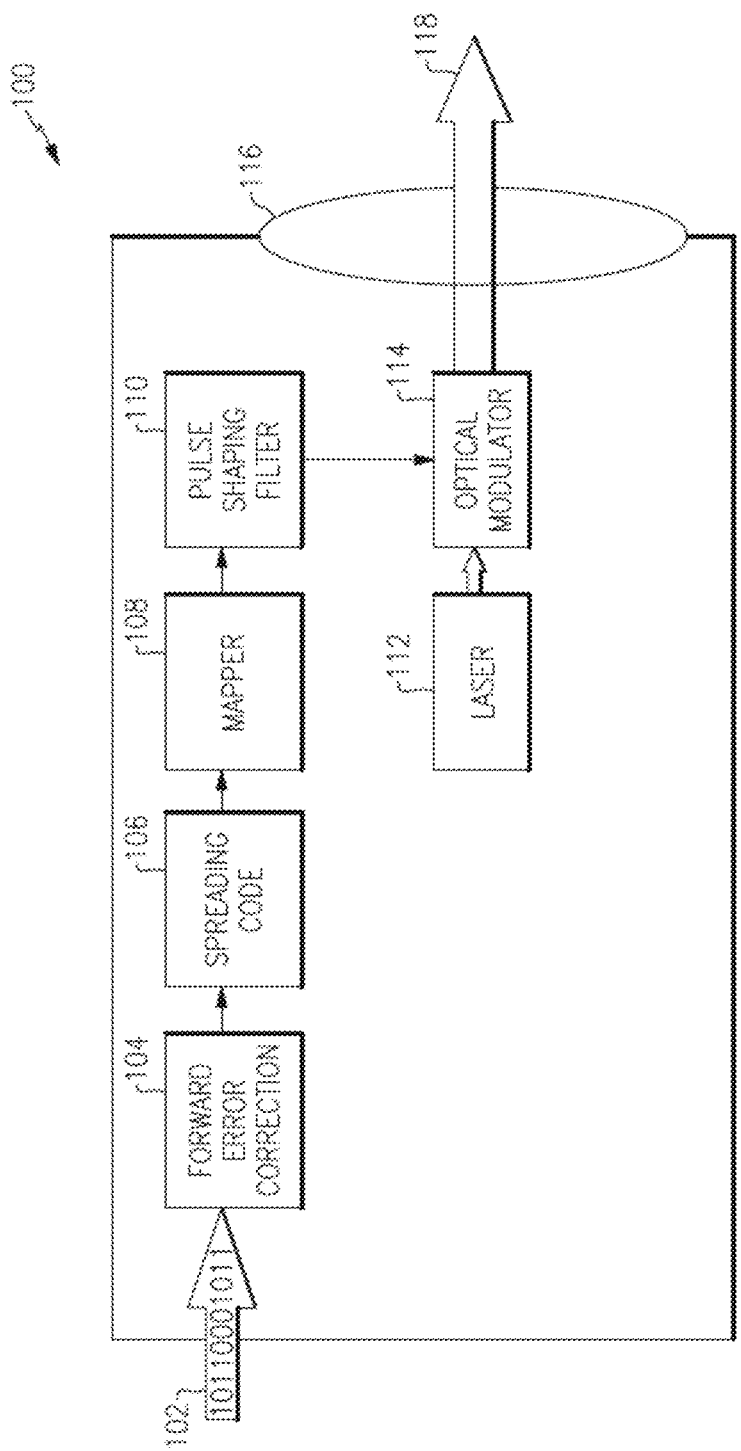
FIG. 1 is a block diagram of an optical transmitter for use with various examples described herein.

Aspects and examples described herein provide systems and methods for demodulation of phase-encoded (i.e., phase modulated) optical signals without a locally coherent clock source. In certain examples, the system includes an optical resonator, such as a Fabry-Perot filter/resonator, for converting a phase-encoded optical signal into an intensity-encoded optical signal. The intensity-encoded optical signal may be used to detect information encoded in the phase-encoded optical signal. As further described herein, examples of the optical resonator include an optical medium that is dynamically excited by a pump assembly to control an optical gain in the received optical signal. In particular, a modulation waveform may be encoded on a pump signal to produce an encoded pump signal that, when provided to the optical resonator, shapes an intensity profile of the intensity-encoded optical signal. Various different modulation waveforms may be encoded on the pump signal to produce a desired intensity profile of the intensity-encoded optical signal. For instance, the intensity-encoded optical signal may be shaped to improve the detectability of the phase-encoded optical signal, as well as, one or more variations (e.g., phase transitions) in the phase-encoded optical signal. Moreover, the intensity-encoded optical signal may be shaped to avoid one or more operations traditionally performed by digital signal processing components, such as filtering and/or pattern matching.

Phase encoded optical signals may come from numerous sources and/or be generated by numerous processes. Detection of a phase encoding may therefore be useful for many purposes. For instance, a coherent optical signal, such as a laser beam, may be modulated by a data communications transmitter to encode communicated information on an optical signal. However, other types of information, such as timing and/or time stamp information, may also be encoded as a phase modulation. Various processes phase modulate a coherent light source, and, accordingly, information about the process may be recovered by appropriate demodulation (e.g., interpreting) of the phase modulated optical signal. For example, various measurement systems may transmit an optical signal and analyze a reflected signal to determine dimensions, movement, defects, etc.

Some examples of typical phase modulation receivers include local oscillators, Fiber Bragg Gratings, and delay line interferometers. Each of these receivers has significant drawbacks. In particular, these systems typically require components that are complex, large, and/or costly, and often have significant functional limitations. For example, many conventional approaches include a laser positioned within the receiver to convert a phase modulation to an amplitude modulation. However, these techniques require a highly stable laser having a narrow-line width. Another typical approach uses a FBG to convert the phase modulation to amplitude modulation, which requires an optical circulator element, thereby increasing the complexity, size, and cost. A further conventional approach uses a Mach-Zehnder delay line interferometer and is limited to a single communication data rate.

Examples of various systems for which demodulation of phase modulated optical signals may be beneficial include target designators, laser guidance systems, laser sight, laser scanners, 3D scanners, homing beacons and/or surveying systems, as well as communication systems. In at least some of these examples, an optical signal may arrive via a free space signal path (e.g., free space optical, FSO), a fiber coupling, or another waveguide system. Systems and method for demodulation of phase modulated optical signals in accord with aspects and examples disclosed herein may be beneficially applied to any of the above example optical systems, or others, to receive, detect, recover, etc. useful information from an optical signal having phase encoding.

It is to be appreciated that embodiments of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

For the purposes of this disclosure, and as will be understood by those of skill in the art, the terms light, light signal, and optical signal may be used interchangeably herein and refer generally to an electromagnetic signal that propagates through a given medium, which may be empty space, e.g., a vacuum, or may be an atmospheric, e.g., air, or other medium, such as fiber or other optics components. The terms light, light signal, and optical signal are not meant to imply any particular characteristic of the light, such as frequency or wavelength, band, coherency, spectral density, quality factor, etc., and may include radio waves, microwaves, infrared, visible, and/or ultraviolet electromagnetic radiation, or other non-ionizing electromagnetic radiation conventionally processed in the field of optics, to name a few examples.

Many optical receivers (e.g., coherent receivers) require a stable clock in order to accurately perform demodulation processes for a received signal, and may also require sophisticated optics such as 90-degree hybrids, phase shifters, and the like, especially when modulation includes encoding of information in polarization of the optical signal. In contrast, optical receivers (also referred to as "optical signal receivers") in accord with the aspects and examples disclosed herein do not require a local coherent clock source and do not require significant optical components to achieve the same receiver capabilities as a conventional optical receiver. The benefits are achieved, at least in part, by an optical front-end that includes an optical resonator capable of detecting modulation transitions, such as phase variations, in a received optical signal without a coherent reference source. The optical resonator further transforms the modulation, e.g., phase modulation, into an intensity modulation that allows simplified processing, potentially in the electrical domain.

Figure 2:
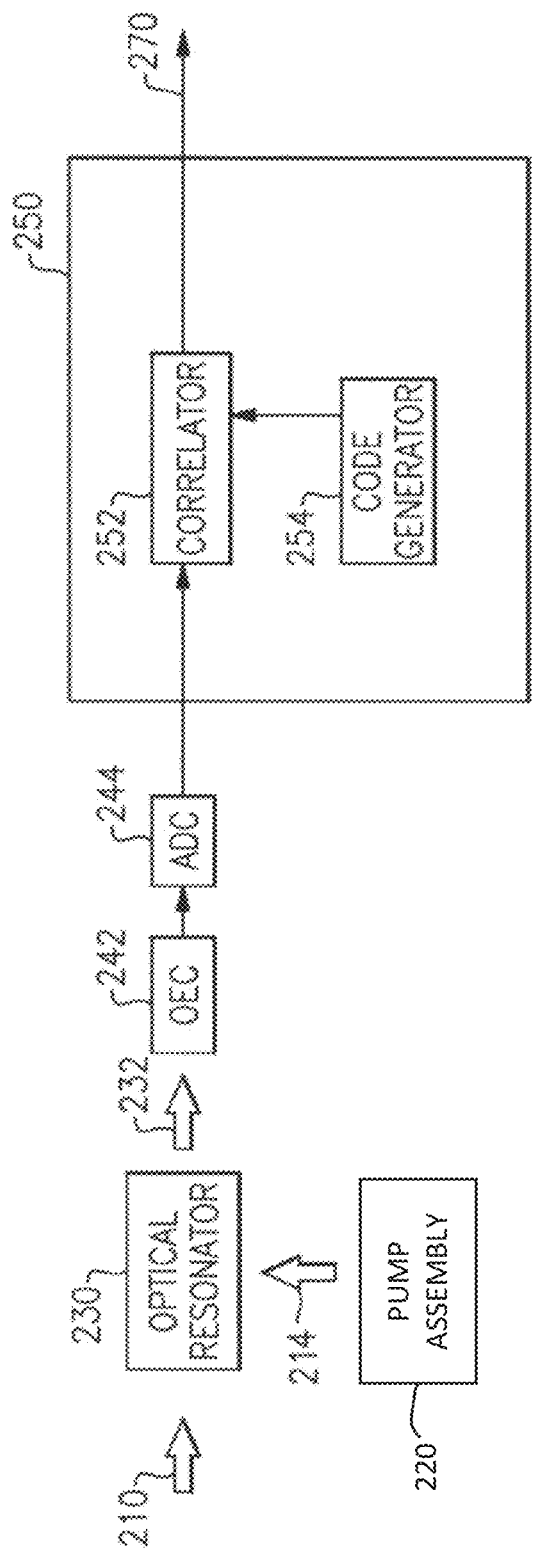
FIG. 2 is a block diagram of an optical receiver according to various examples described herein.

A functional block diagram of one example of a transmitter (e.g., optical transmitter 100) is illustrated in FIG. 1, and a functional block diagram of one example of a receiver (e.g., optical signal receiver 200) is illustrated in FIG. 2. The transmitter illustrated in FIG. 1 may be combined with the receiver illustrated in FIG. 2 to provide one example of a communication assembly, as will be readily apparent to one of ordinary skill in the art given the benefit of this disclosure.

Though the components of the example optical transmitter 100 (also referred to herein as "optical signal transmitter" 100) shown in FIG. 1 and the optical receiver 200 (also referred to herein as "optical signal receiver" 200) shown in FIG. 2 may be shown and described as discrete elements in a block diagram, and may be referred to as "module", "circuitry", or "circuit," unless otherwise indicated, the components may be implemented as one of, or a combination of, analog circuitry, digital circuitry, or one or more microprocessors executing software instructions (e.g., predefined routines). In particular, the software instructions may include digital signal processing (DSP) instructions. Unless otherwise indicated, signal lines between components of the optical transmitter 100 and components of the optical receiver 200 may be implemented as discrete analog, digital, or optical signal lines. Some of the processing operations may be expressed in terms of calculations or determinations by the optical transmitter 100, the optical receiver 200, a detector, a controller, or other components. The equivalent of calculating and determining values, or other elements, can be performed by any suitable analog or digital signal processing techniques and are included within the scope of this disclosure. Unless otherwise indicated, control signals may be encoded in either digital or analog form.

Referring to FIG. 1, one example of an optical transmitter 100 may include an input 102 to receive a data payload, a forward error correction (FEC) module 104, a spreading module 106, a mapping module 108, a pulse-shaping filter 110, an optical source (e.g., a laser) 112, a modulator 114, one or more optics 116, and an output 118 to provide an optical signal output. In the optical transmitter 100, the FEC module 104 implements forward error correction by adding redundancy to the received data payload with a block code or convolution code. For example, the FEC module 104 may repeat one or more bits within the data payload to reduce an effect that the transmission medium may have on the transmitted signal waveform. Accordingly, in various examples the optical transmitter 100 may include a FEC module 104 to control errors that may result from transmitting the data payload through a noisy or lossy medium. Following the FEC module 104, the data payload is provided to the spreading module 106.

The transmitter 100 includes a spreading module 106 that applies a spreading code to the data payload. The spreading code is useful for identifying and processing signal components in the receiver, and may reduce the effects of inter-symbol interference (ISI). For example, the spreading module 106 may include a pseudo-random code generator (PRCG) and may apply direct sequence spread spectrum (DSSS) techniques, while other examples of transmitters or spreading modules may apply other forms of spreading. The mapping module 108 receives the data payload from the spreading module 106 and maps the data payload to a particular modulation scheme. For instance, the mapping module 108 may map the data payload to various positions of a particular phase and amplitude constellation, depending upon the types of modulation used by the transmitter, e.g., phase, amplitude, frequency, or any combination of these.

A pulse-shaping filter 110 may receive an output of the mapping module 108 and control the modulator 114 to impose the modulation scheme on the optical source 112 to generate a modulated optical signal. In various examples, the modulator 114 may be an electro-optic modulator, and may include the optical source 112, such as a laser. In particular, the optical source 112 may emit a continuous carrier waveform that is modulated (e.g., in phase, amplitude, and/or frequency) for each symbol of the data payload to encode those symbols on the carrier waveform. The transmitter 100 may also include one or more optics 116, such as one or more mirrors or lenses, which direct the optical signal at the output 118. Specifically, the one or more optics 116 may be used to direct the optical signal in a direction of an optical receiver (e.g., the optical receiver 200 illustrated in FIG. 2).

Referring to FIG. 2, illustrated is an example of an optical receiver 200 according to various examples discussed herein. FIG. 2 is described with continuing reference to the optical transmitter 100 of FIG. 1, which may communicate data payloads to the optical receiver 200. For instance, the optical receiver 200 may receive an optical signal transmitted along a free space signal path (e.g., free space optical, FSO), a fiber coupling, or another waveguide system by the optical transmitter 100 of FIG. 1. In various examples, the optical receiver 200 may be paired together with the optical transmitter 100 to form a bidirectional data communication system (e.g., a transceiver). The transceiver may be capable of bidirectional data communication with another transmitter/receiver pair.

As illustrated in FIG. 2, the optical receiver includes an optical resonator 230, an optical-electrical converter (OEC) 242, an analog to digital converter 244, a pump assembly 220, and a digital processing subsystem 250. As discussed herein, the OEC 242, analog to digital converter 244, and digital processing subsystem 250 may be collectively referred to as a detector. However, in various other examples, the OEC 242, analog to digital converter 244, and digital processing subsystem 250 may be separate components.

The optical resonator 230 is positioned to receive an optical signal 210. The optical resonator 230 may be coupled to the digital processing subsystem 250 by the OEC 242 and the analog to digital converter 244, for example. The digital processing subsystem 250 is configured to provide an output 270 to one or more downstream components based on the received optical signal 210 and/or one or more characteristics of the received optical signal 210.

Examples of optical resonators 230 may include Fabry-Perot etalons, micro-rings, or other types of resonators. The optical resonator 230 is a component capable of sensing variations, such as phase variations, in the received optical signal 210. The variations in the received optical signal 210 are representative of a modulation performed at the transmitter. That is, the one or more variations may be representative of information encoded on the optical signal 210. In various examples, the optical resonator 230 is coupled to the pump assembly 220, which may excite one or more components (e.g., an optical medium) of the optical resonator 230 with a pump signal. The pump signal, when received at the optical resonator 230, may excite the optical medium to generate an optical gain (e.g., amplify) the received optical signal 210.

As further described below with reference to at least FIG. 3A the optical resonator 230 transforms the variations into an intensity modulation of output optical signal energy (e.g., shown as output optical signal energy 232 in FIG. 2). In particular, the optical resonator 230 converts a modulation of the received optical signal 210 in part by interaction of the arriving optical signal 210 with resonant optical signal energy accumulated within the optical resonator 230. In various examples, modulation of a pump signal provided by the pump assembly 220 may control a waveform shape (e.g., an intensity profile) of the output optical signal energy 232. Particular examples of an optical resonator 230 and an encoded (e.g., modulated) pump signal 214 are further described below with reference to at least FIGS. 3A-3D.

In various examples, the output optical signal energy 232 is directed to the OEC 242. The OEC 242 converts the intensity-modulated output optical signal energy 232 into an electrical signal. For example, the OEC 242 may include a photodetector, such as a photodiode. Accordingly, the OEC 242 may produce an amplitude modulated signal representative of the intensity-modulated output optical signal energy 232. The amplitude modulated signal representative of the intensity-modulated output optical signal energy 232 may be converted to a digital form by the analog to digital converter 244. The digital signal is provided to the digital processing subsystem 250 for digital processing. The digital processing subsystem 250 processes the digital signal to receive the information-carrying content of the optical signal 210. The basic operation of the digital processing subsystem 250 is known in the art, and may include, e.g., a correlator 252 and a code generator 254, but the details of any particular implementation may vary.

In various examples, a receiver in accord with aspects and examples disclosed herein may include additional or fewer optics than discussed above, and may omit or add various components relative to those discussed above. For example, focusing optics may be included to receive the output optical signal energy 232 from the optical resonator 230 and to focus the output optical signal energy 232 on the OEC 242. In certain examples, the receiver 200 may also include one or more optics (now shown) that collect and direct the optical signal 210 to the optical resonator 230. Certain examples of the receivers described herein may also use analog receiver circuitry and therefore may omit one or more of the ADCs 224. Various examples may include a channel estimator as part of the digital processing subsystem 250 to provide phase rotation or other signal adjustments as may be known in the art.

As discussed above, suitable optical resonators may include etalons, micro-rings, or other structures. Some details of at least one example of an etalon is discussed below with respect to FIGS. 3A-3D. However, examples of the optical resonators described herein are not limited to the arrangement illustrated in FIGS. 3A-3D. For instance, in one example an optical resonator may be a micro-ring formed of one or more waveguides arranged as a closed loop such that optical signal energy traversing "around" the loop may be phase aligned with a dimension of the loop at one or more frequencies. Accordingly, optical signal energy traversing the loop may constructively interfere with itself, at certain frequencies, to sustain the optical signal energy within the loop. At other frequencies, optical signal energy traversing the loop will destructively interfere with itself thereby destroying, or rejecting, a build-up of optical signal energy at that frequency. The closed loop is also coupled to an input and output to allow light to enter the loop, e.g., an aperture, and to let light out of the loop. A controllable optical medium may be used in a micro-ring resonator in a manner similar to that described below with reference to an etalon.

The use of the term "etalon" throughout this disclosure is not intended to be limiting and as used herein may include any of multiple structures, including plates with reflecting surfaces as well as parallel mirrors with various materials positioned in-between, and in particular examples, with controllable optical materials positioned in-between. The spacing between the semi-reflective surfaces of an etalon may be referred to herein as a cavity, but is not so limited. That is the optical resonators may include other structures, such interferometers and the like. Additionally, etalon structures may be formed as a laminate, layer, film, coating, or the like.

In some examples, an optical resonator (e.g., an etalon) may include reflective surfaces (including semi-reflective surfaces) that are not co-planar and/or are not co-linear. For example, an interior reflective surface of an optical resonator may include some curvature, and an opposing surface may also be curved such that a distance between the two surfaces is substantially constant across various regions of the optical resonator, in some examples. In other examples, an optical resonator may have non-linear or non-planar surfaces with varying distances between the surfaces at various regions, and may still function as an optical resonator for various wavelengths and at various regions, suitable for use in examples discussed herein. Accordingly, an optical resonator may be purposefully designed to conform to a surface, or to have various regions responsive to differing wavelengths, or responsive to differing angles of arrival for a given wavelength, in certain examples.

Figure 3A:
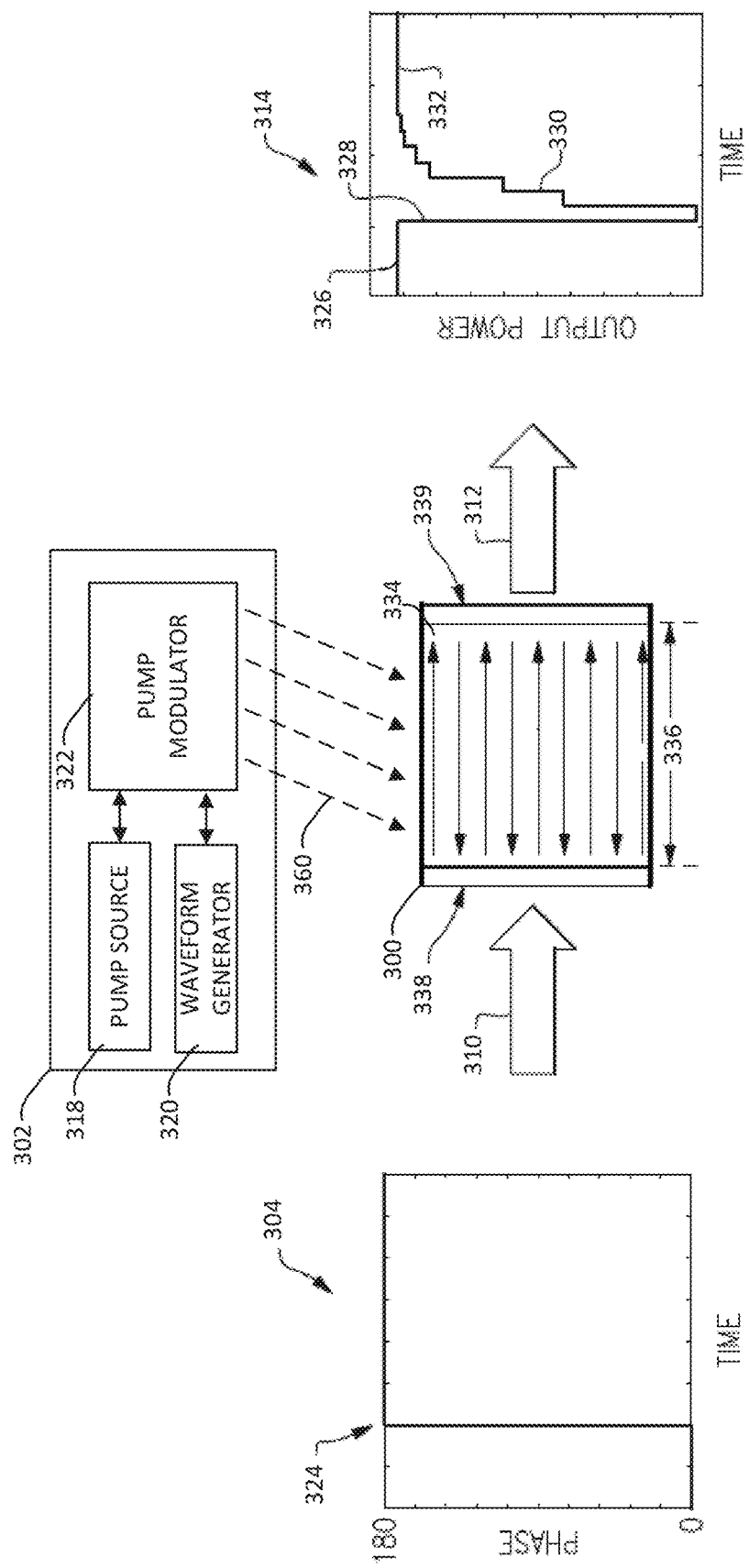
FIG. 3A illustrates an optical resonator coupled to a pump assembly, including a graph of received signal phase and a graph of output intensity of the optical resonator, according to various examples described herein.

FIG. 3A illustrates an example of an optical resonator 300 coupled to a pump assembly 302. The optical resonator 300 may be used in various examples of an optical receiver in accord with aspects and examples described herein. For instance, the optical resonator 300 may be used as the optical resonator 230 in FIG. 2. The pump assembly 302 may be used as the pump assembly 220 in FIG. 2. In various examples, the optical resonator 300 may be used to convert phase modulations of a received optical signal ("optical signal" 310) into intensity or amplitude modulations of output optical signal energy 312. The intensity or amplitude modulated output optical signal energy 312 may then be converted to an electrical signal by an OEC (e.g., OEC 242 shown in FIG. 2), with corresponding amplitude variations representative of the phase modulation of the received optical signal 310. The optical resonator 300 causes the received optical signal 310 to resonantly interact with itself, internal to the optical resonator 300, such that phase changes in the received optical signal 310 disrupt the resonance of optical signal energy within the optical resonator 300 and cause amplitude (or intensity) variations in the output optical signal energy 312, which may be coupled directly to the OEC and other components of a detector.

As illustrated in FIG. 3A, in various examples, the optical resonator 300 is an etalon. That is, the optical resonator 300 may include a pair of parallel semi-reflective surfaces with an at least semi-transparent medium interposed therebetween. As described, in some examples the semi-transparent medium is an optical medium 334 that may be controlled to selectively amplify the received optical signal 310 when excited by an optical or electrical signal (e.g., an encoded pump signal 360). Accordingly, in many instances, the optical medium 334 is referred to herein as an "active" optical medium and/or a "controllable" optical medium.

In various examples the optical resonator 300 may include an interior (e.g., a cavity) that is defined by a pair of semi-reflective surfaces (e.g., shown as a first-semi reflective surface 338 and a second semi-reflective surface 339 in FIG. 3A). The first semi-reflective surface 338 is positioned in optical communication with the second semi-reflective surface 339. In particular, in FIG. 3A the first semi-reflective surface 338 is positioned substantially parallel and facing the second semi-reflective surface 339. As illustrated in FIG. 3A, in various examples each of the first and second semi-reflective surfaces 338, 339 are substantially planar. However, in other examples, other arrangements and surface curvatures may be used. The optical medium 334 is positioned inside the optical resonator 300 and interposed between the first semi-reflective surface 338 and the second semi-reflective surface 339.

The optical resonator 300 may have one or more characteristic resonant frequencies, each associated with a certain wavelength of light, based upon the spacing (i.e., dimensional length) between the semi-reflective surfaces 338, 339. In some examples, the surfaces 338, 339 are semi-reflective and also semi-transmissive, in that they allow some light through. Accordingly, the arriving optical signal 310 may be allowed into the optical resonator 300 (i.e., between the pair of semi-reflective surfaces 338, 339) and may resonate inside the optical resonator 300 and between the pair of semi-reflective surfaces 338, 339. As illustrated, the optical signal energy resonating between the first semi-reflective surface 338 and the second semi-reflective surface 339 propagates through the optical medium 334. While shown in FIG. 3A as being composed of a single material, in certain other examples, the optical medium 334 may include multiple layers of the same material or different materials.

As further illustrated in FIG. 3A, some of the resonating optical signal energy inside the optical resonator 300 is emitted out of the optical resonator 300 through one of the semi-transmissive surfaces 338, 339 (referred to as the "output optical signal energy"). Accordingly, the first semi-reflective surface 338 and the second semi-reflective surface 339 may each also be semi-transmissive. In various examples, one of the first semi-reflective surface 338 and the second semi-reflective surface 339 may form an entrance aperture (shown as the first semi-reflective surface 338 in FIG. 3) through which the arriving optical signal 310 is received and directed into the inside of the optical resonator 300. The other of the first semi-reflective surface 338 and the second semi-reflective surface 339 (shown as second the semi-reflective surface 339 in FIG. 3A) forms an optical output from which the output optical signal energy 312 is emitted. That is, the second semi-reflective surface 339 allows a portion of trapped resonating optical signal energy from the interior to emerge as the output optical signal energy 312. Accordingly, the second semi-reflective surface 339 is also semi-transmissive, such that optical signal energy arriving (from the active optical medium 334) at the second semi-reflective surface 339 is partially reflected back to the interior and partially transmitted through the output.

In particular examples, the optical resonator 300 is designed to have a resonant frequency aligned with the source, e.g., a transmit laser, of the optical signal 310. In various examples, a dimensional scale, e.g., length 336, of the optical resonator 300 is selected such that the optical resonator 300 exhibits optical resonance at the wavelength of the received optical signal 310. The effect of the pump assembly 302 on the optical medium 334 of the optical resonator 300 may be taken into consideration when selecting the dimensional scale of the optical resonator 300. In certain examples, such dimensional scales are much shorter than the length of a transmitted symbol, which is the distance traveled by the optical signal 310 between transitions that convey information, e.g., between phase changes in a phase modulated signal.

The optical signal 310 received by the optical resonator 300, an etalon in this example, may establish a steady-state condition in which optical signal 310 continuously arrives at the optical resonator 300, accumulates or adds to build-up resonating optical signal energy inside the optical resonator 300, and emerges from the optical resonator 300 at a constant rate (i.e., a steady-state output value). A variation in the arriving phase, frequency, or amplitude of the optical signal 310 may disrupt the optical signal energy resonating inside the optical resonator 300, and, accordingly, disturb the output optical signal energy 312. Once the steady state condition is re-established (i.e., the optical signal 310 arrives at a constant rate without a variation), the output optical signal energy 312 returns to the corresponding constant rate.

Accordingly, a change in phase, frequency, or amplitude of the arriving optical signal 310 causes a change in intensity of the emerging output optical signal energy 312. A large phase transition in the arriving optical signal 310, for example, causes a large (but temporary) intensity change in the emerging output optical signal energy 312. Similar operation occurs in a micro-ring or other optical resonator. Accordingly, in various examples, the optical resonator 300 functions as a demodulator, or a modulation converter, for a received optical signal (e.g., optical signal 310). The emerging output optical signal energy 312 may therefore carry the same information content as the arriving optical signal 310, but in intensity modulated form.

The optical resonator 300 may have varying levels of reflectivity and transitivity of the semi-reflective surfaces 338, 339. In certain examples, the reflectivity may be expressed as a fraction of light amplitude reflected back into the optical medium 334 (e.g., in the interior of the optical resonator 300), or may be expressed as a fraction of light intensity reflected back into the active optical medium 334 (e.g., into the interior of the optical resonator 300). In a particular example, an amplitude reflectivity of the first semi-reflective surface 338 may be $r_1=0.999$ and an amplitude reflectivity of the second semi-reflective surface 339 may be $r_2=0.985$. In other examples the reflectivity of each of the first and second semi-reflective surfaces 338, 339 may be different, and may be any suitable value for a particular implementation.

In various examples, the optical resonator 300 is optically and/or electrically coupled to the pump assembly 302. In particular, the pump assembly 302 may be coupled to the optical resonator 300 at the optical medium 334. The pump assembly 302 is configured to provide an encoded pump signal 360 to the optical medium 334 to control a gain of the optical medium 334 and thereby modify a waveform shape of the output optical signal energy 312. As illustrated in FIG. 3A, in various examples the pump assembly 302 includes a pump source 318, a waveform generator 320, and a pump modulator 322. The pump source 318 and the waveform generator 320 are each coupled to the pump modulator 322, which may provide the encoded pump signal 360 to the optical medium 334.

The pump source 318 is configured to emit a pump signal and direct the pump signal to the pump modulator 322. In various examples the pump source 318 is a light source, such as a continuous-wave laser. That is, the pump source 318 may be continuously pumped and continuously emit an optical pump signal. The laser may be a solid-state laser (e.g., semiconductor laser) or any other suitable laser source. In various other examples, the pump source 318 is a current source or a voltage source configured to provide an electrical signal to the pump modulator 322. The type of pump source (e.g., optical or electrical) may depend on the particular material chosen for the optical medium 334, as further described below. In various examples, the pump source 318 emits a continuous carrier pump waveform that is modulated (e.g., in phase, amplitude, and/or frequency) by the pump modulator 322 to encode a modulation waveform on the pump signal.

In various examples, the waveform generator 320 is configured to provide the modulation waveform to the pump modulator 322. The waveform generator 320 may generate one or more electrical or optical modulation waveforms to be encoded on the pump signal to generate the encoded pump signal 360. For instance, the waveform generator 320 may include a pulse generator or a function generator. The waveform generator 320 may provide a continuous modulation waveform and may dynamically adjust the modulation waveform during the operation of the pump assembly 302. The particular modulation waveform provided by the waveform generator 320 may affect a gain of the optical medium 334, and thereby, affect the output optical signal energy 312 of the optical resonator 300. In various examples, the particular modulation waveform provided by the waveform generator 320 may be controlled to produce a desired intensity profile of the output optical signal energy 312. For instance, the encoded pump signal 360 may shape a waveform of the output optical signal energy 312 to perform one or more filtering operations and/or pattern matching operations. For example, a pseudo-random sequence of pulses known by both the sender and receiver of a signal may be applied to select various bits of information in the signal and thereby increase the security of the communication. In another example, a logic operation may be optically implemented by pulsing the encoded pump signal 360 in a predetermined manner.

In various examples, the pump modulator 322 modifies one or more properties of the pump signal to encode the modulation waveform on the pump signal and provide an encoded pump signal 360. The particular modulation used by the pump modulator 322 may be phase, amplitude, frequency, wavelength, or any combination thereof, and may depend on the particular implementation of the associated optical signal receiver. For instance, the pump modulator 322 may include an electro-optical modulator. In various examples, the encoded pump signal 360 may have one or more characteristics, such as a wavelength, that are tuned based on the properties of the received optical signal 310 and/or the properties of the optical medium 334. For instance, a wavelength of the encoded pump signal 360 may be selected to achieve a desired optical gain based on a wavelength of the received optical signal 310.

As shown, the pump modulator 322 is configured to direct the encoded pump signal 360 to the optical medium 334 of the optical resonator 300. While not shown in FIG. 3A, in various examples the pump assembly 302 may further include one or more electrical coupling elements or optical coupling elements to route the encoded pump signal 360 to the optical medium 334. For instance, the optical assembly 302 may include one or more mirrors, lenses, fiber couplings, or electrical couplings between the optical resonator 300 and the pump modulator 302.

While shown in FIG. 3A as receiving an optical encoded pump signal, in various other examples the optical medium 334 may be responsive to other forms of excitation, such as an electrical current, an electrical voltage, or a mechanical excitation (e.g., displacement). Accordingly, while described with reference to an optical encoded pump signal for the convenience of description it is appreciated that other implementations of the pump assembly 302 and optical resonator 300 are not limited in such a manner.

In various examples, the optical medium 334 may include one or more active material layers that, when controlled (e.g., excited), amplify the received optical signal 310. Accordingly, excitation of the one or more active material layers of the optical medium 334 may amplify the resonating optical signal energy inside the optical resonator 300, as well as, the output optical signal energy 312. In such an example, the modulation of the encoded pump signal 360 modulates a gain of the optical medium 334 to modify the provided amplification and "shape" the waveform shape of the output optical signal energy 312. In particular, the encoded pump signal 360 may maintain an energy level of the output optical signal energy 312 while modifying an intensity profile thereof.

FIG. 3A illustrates the optical medium 334 receiving an optical encoded pump signal at about an orthogonal angle (e.g., about 90 degrees) to excite the optical medium 334. Although the encoded pump signal 360 is illustrated incident on the optical medium 334 at about an orthogonal angle (e.g., about 90 degrees), in other examples, the encoded pump signal 360 may be directed to the optical medium 334 at other angles and in other orientations.

The particular material or materials of the optical medium 334 may be selected based on the application of the optical resonator 300. For instance, in some examples the optical medium 334 may be formed from a material or materials that are optically controllable while in other examples the optical medium 334 may be formed from a material or materials that are electrically controllable. For instance, in one example the optical medium 334 is a gain medium such as a crystal material, a glass material, or a semiconductor-based material. In particular, the optical medium 334 may be a non-linear optical crystal. In some example, the optical medium 334 may include a doped glass or crystalline structure that has an absorption band and an emission band. In particular, the optical medium 334 may be selected to have an emission band that encompasses a wavelength of the received optical signal 310. The pump source 318 may then be controlled to generate a pump signal having a wavelength within the absorption band of the optical medium 334. Accordingly, when directed at the optical medium 334, the encoded pump signal 360 may be absorbed by the optical medium 334 and therefore cause an emission of energy within the emission band. Such an emission produces the described amplification.

Conversely, when the encoded pump signal 360 is not directed at the optical medium 334, or is provided at a low or zero signal level, no amplification in the received optical signal 310 occurs. Accordingly, in some examples, the optical medium 334 may be selectively and/or dynamically controlled by the encoded pump signal 360 to selectively provide and control an amplification of the optical signal 310.

With continuing reference to FIG. 3A, in some examples, the first-semi reflective surface 338 and second semi-reflective surface 339 may be at least partially reflective to the encoded pump signal 360, and may reflect at least a portion of the encoded pump signal 360 within the inside of the optical resonator 300. Such an implementation would ensure a uniform illumination (e.g., excitation) of the optical medium 334 in an example in which the encoded pump signal 360 is an optical beam. However, as discussed in other examples, the pump source 318 may include an electrical source electrically coupled to the optical medium 334 and configured to electrically excite the optical medium 334, for instance, by providing an electrical current or voltage. In such an example, the electrical source may be electrically coupled to the optical medium 334 by one or more electrical leads or cables.

As discussed herein, the optical resonator 300 coherently develops output optical signal energy 312 based on a received optical signal 310, and maintains a given level of the output optical signal energy 312 until a variation (e.g., a modulation in phase) of the received optical signal 310 occurs. In various examples, this given level of output optical signal energy 312 may have a higher intensity level (e.g., a larger amplitude) during the excitation of the optical medium 334 by the encoded pump signal 360, relative to when the active optical medium 334 is not excited by the encoded pump signal 360.

When a phase modulation occurs in the received optical signal 310, destructive interference inside the optical resonator 300 causes a phase-dependent change in the amplitude of the output optical signal energy 312. This can be seen in the input phase plot 304 and the output power plot 314 illustrated in FIG. 3A. Accordingly, a received phase encoded optical communication signal, such as received optical signal 310, is converted to an amplitude varying signal, such as the output optical signal energy 312, by the optical resonator 300. The output optical signal energy 312 is suitable for direct detection by a sensor, such as the OEC 242 illustrated and described with reference to FIG. 2. Additionally, the optical resonator 300 will function over a broad range of data rates without the need to modify the optical characteristics of the system, such as detector setup, path length adjustments, delay elements, or the like. For example, the ability of the optical resonator 300 to convert an arriving phase modulated input optical signal 310 into intensity modulated output optical signal energy 312 may be independent of the modulation rate at which the input phase is changing, in some examples.

FIG. 3A further illustrates the operation of the optical resonator 300 with reference to the output power plot 314 of optical signal intensity (as output power) emerging from the optical resonator 300, during a phase transition 324 in the received optical signal 310. At point 326 the optical resonator 300 is in a steady-state resonance condition wherein a steady intensity of output optical signal energy 312 emerges. At point 328 a phase transition 324 occurs in the arriving optical signal 310, temporarily disrupting the steady-state and causing a change in the emerging light intensity of the output optical signal energy 312. During successive reflections inside the optical resonator 300 (e.g., accumulation of the resonating optical signal energy), labeled at point 330, resonance is re-established and the emerging light intensity of the output optical signal energy 312 increases until, at point 332, a steady intensity of light emerges when the optical resonator 300 has returned to a steady-state condition.

Accordingly, a disruption in the emerging light intensity of the output optical signal energy 312 from the optical resonator 300 indicates that a variation occurred in an arriving optical signal 310. As discussed, this variation may be a variation in a phase, frequency, or amplitude of the received optical signal 310. As such, the disruption in the output optical signal energy 312 may be used by appropriate signal processing components (e.g., a detector) to determine useful information (e.g., a characteristic of the variation in the received optical signal 310) by analyzing the emerging light intensity of the output optical signal energy 312. In the example discussed above and illustrated by FIG. 3, the arriving optical signal 310 is presumed to be phase modulated, but other examples include frequency or amplitude modulation, or any combination of these, and may cause similar variations or other detectable variations in output intensity. In some examples, higher order or more complex modulation may be accommodated by various optical resonator designs.

As a particular example, an optical resonator (e.g., an etalon) tuned to the wavelength of the received optical signal 310 reacts to a phase variation in the optical signal in accord with the discussion above, and as illustrated in FIG. 3A. If the arriving optical signal 310 is modulated with binary phase shift keying (BPSK), for example, the output illustrated in FIG. 3A indicates each phase shift, and accordingly the information carried in the phase shift keying may be recovered from the intensity variations at the output optical signal energy 312. It should be understood by those of skill in the art with the benefit of this disclosure, that such information recovery is achieved without the necessity for a local coherent clock source to demodulate the arriving optical signal 310.

Figure 3B:
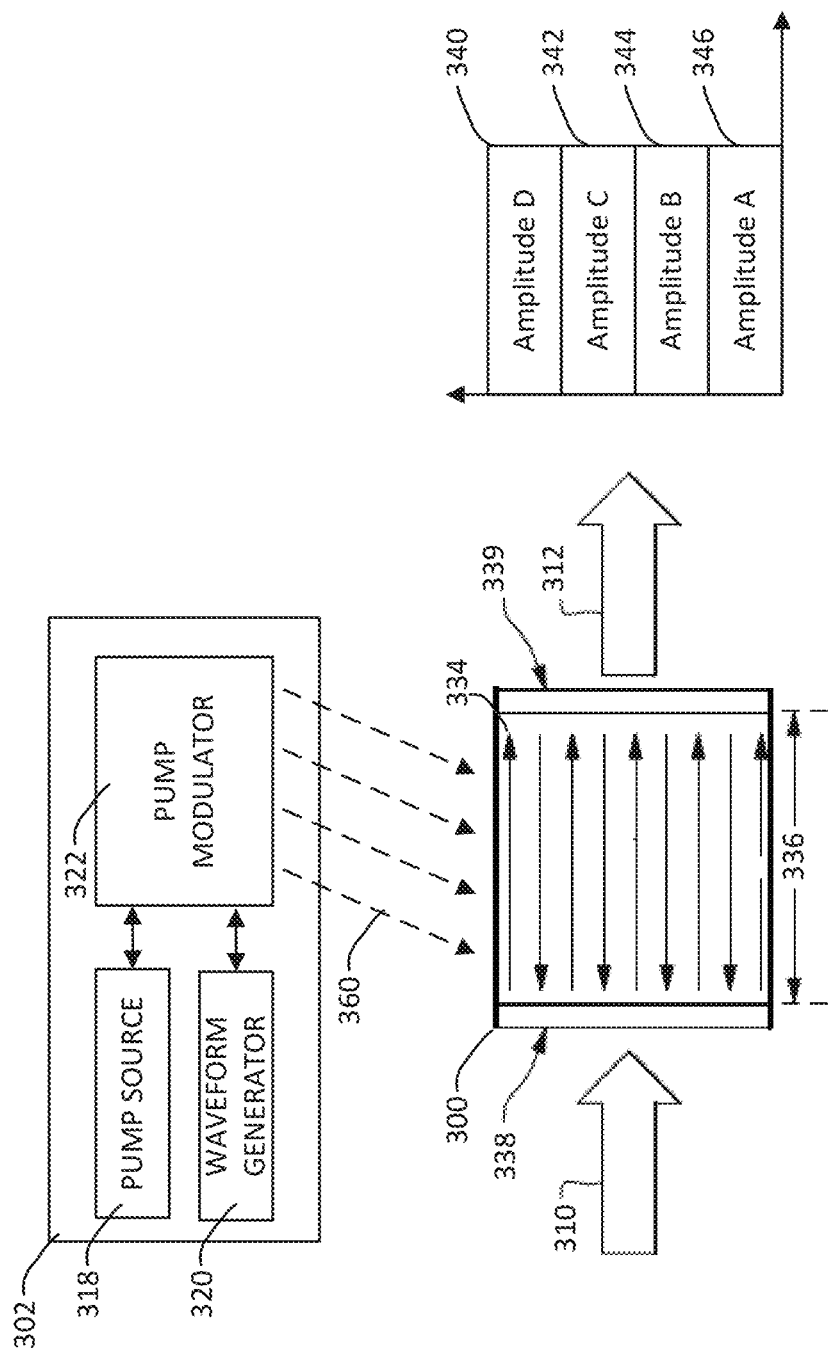
FIG. 3B is another illustration of the optical resonator and pump assembly of FIG. 3A, including a graph of output intensity of the optical resonator, according to various examples described herein.

As shown in FIG. 3A, the output power plot 314 of output optical signal intensity (as output power) is representative of the output power when the active optical medium 334 is continuously driven (i.e., excited) by the encoded pump signal 360. That is, in FIG. 3A, the encoded pump signal 360 may have a substantially constant non-zero amplitude. However, as discussed herein, in various examples the encoded pump signal 360 is encoded with a modulation waveform and therefore may have a varying phase, frequency, amplitude, and/or wavelength. In such an example, the encoded pump signal 360 selectively or dynamically drives (e.g., excites) the optical medium 334. Accordingly, depending on state of the received optical signal 310 and the state of the encoded pump signal 360, the output optical signal energy 312 may have a modified waveform shape (e.g., intensity profile) over time. In further examples, the pump assembly 302 may provide a variety of encoded pump signals 360, each of which, when provided to the optical medium 334, results in a different variety intensity profiles of the output optical signal energy 312. That is, the waveform generator 320 may provide various different modulation waveforms to be encoded on the pump signal, and each modulation waveform may result in a different variety of intensity profiles of the output optical signal energy 312. For example, FIG. 3B illustrates an output power plot of the output optical signal energy 312 of the optical resonator 300 of FIG. 3A when the encoded pump signal 360 is a continuously pulsed pump signal (e.g., pulsed between a substantially zero amplitude value and a substantially non-zero amplitude value). In the output power plot, four different intensity profiles 340, 342, 344, 346 are generally represented by a corresponding amplitude block (e.g., amplitude blocks A-D). That is, for the convenience of illustration, each intensity profile is generally illustrated as a block having a different amplitude. As such, each of amplitude blocks A-D are representative of a different intensity profile of the output optical signal energy 312 for a given state of the encoded pump signal 360 and a given state of the resonant optical signal energy within the optical resonator 300. In particular, the output power plot of FIG. 3B corresponds to the encoded pump signal 360 states and resonant optical signal energy states described below in Table 1.

TABLE 1

| Encoded Pump Signal State | Resonant Optical Signal Energy State | Intensity Profile |
| --- | --- | --- |
| 0 | 0 | Profile 346 |
| 0 | 1 | Profile 342 |
| 1 | 0 | Profile 344 |
| 1 | 1 | Profile 340 |

In Table 1, a "0" within the encoded pump signal state column represents that the encoded pump signal 360 is at the substantially zero value, and a "1" represents that the encoded pump signal 360 is at the substantially non-zero value. For the resonating optical signal energy state column, a "0" represents that the optical resonator 300 is not at resonance, and a "1" represents that the optical resonator 300 is at resonance. As shown in FIG. 3B, the various combinations of encoded pump signal states and resonant optical signal energy states results in four different output optical signal energy intensity profiles, each represented by a different profile 340, 342, 344, 346.

Accordingly, in some examples the encoded pump signal 360 may be modulated such that the optical resonator 300 performs one or more signal processing operations that typically are performed by digital signal processing components. In the described examples, the signal processing operations are performed in the optical domain and therefore may improve the noise performance of the associated optical receiver. In particular, such operations may include those typically performed by one or more digital logic gates, such as a NOR gate.

Figure 3C:
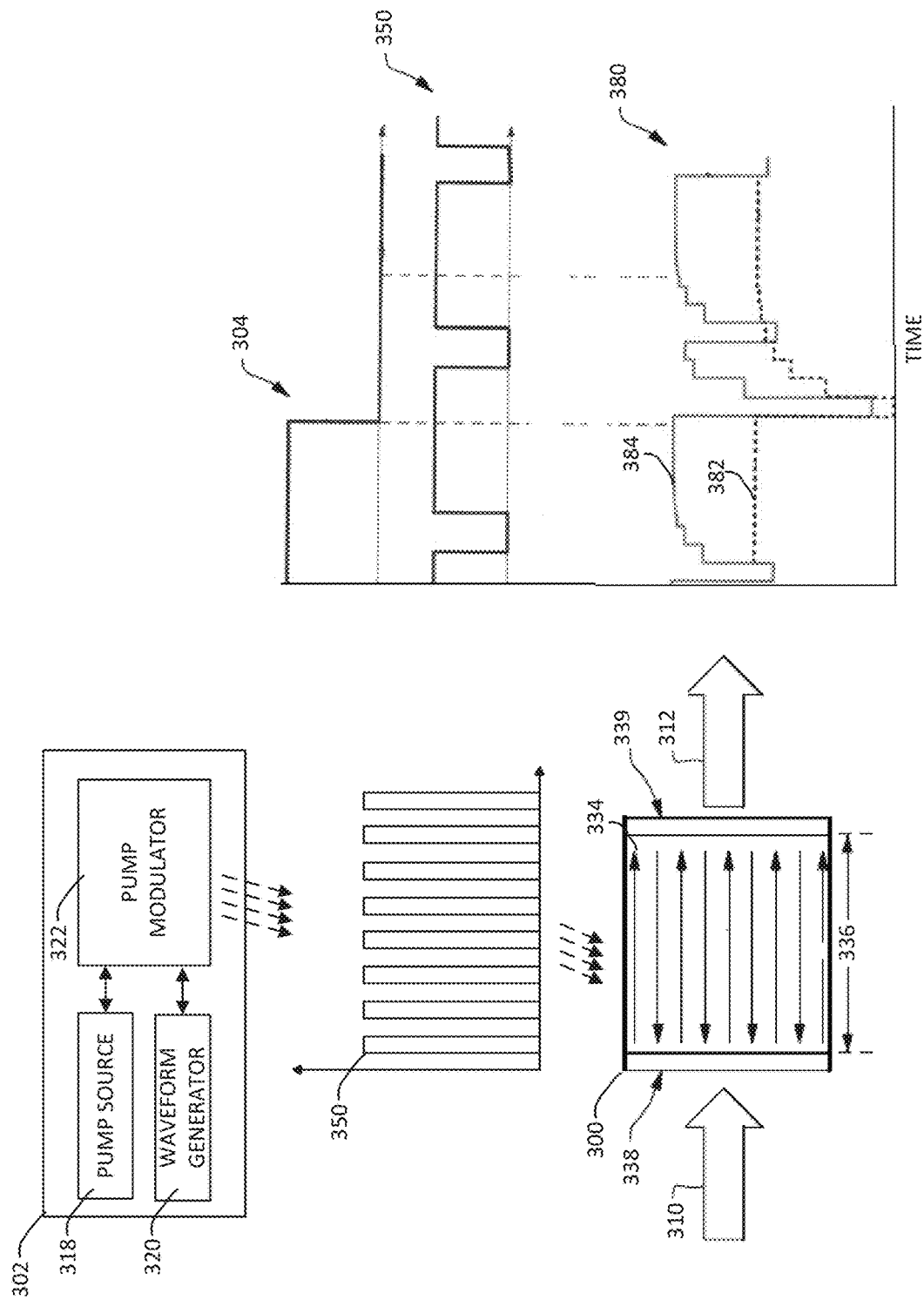
FIG. 3C is another illustration of the optical resonator and pump assembly of FIG. 3A, including a graph of output intensity of the optical resonator, according to various examples described herein.
Figure 3D:
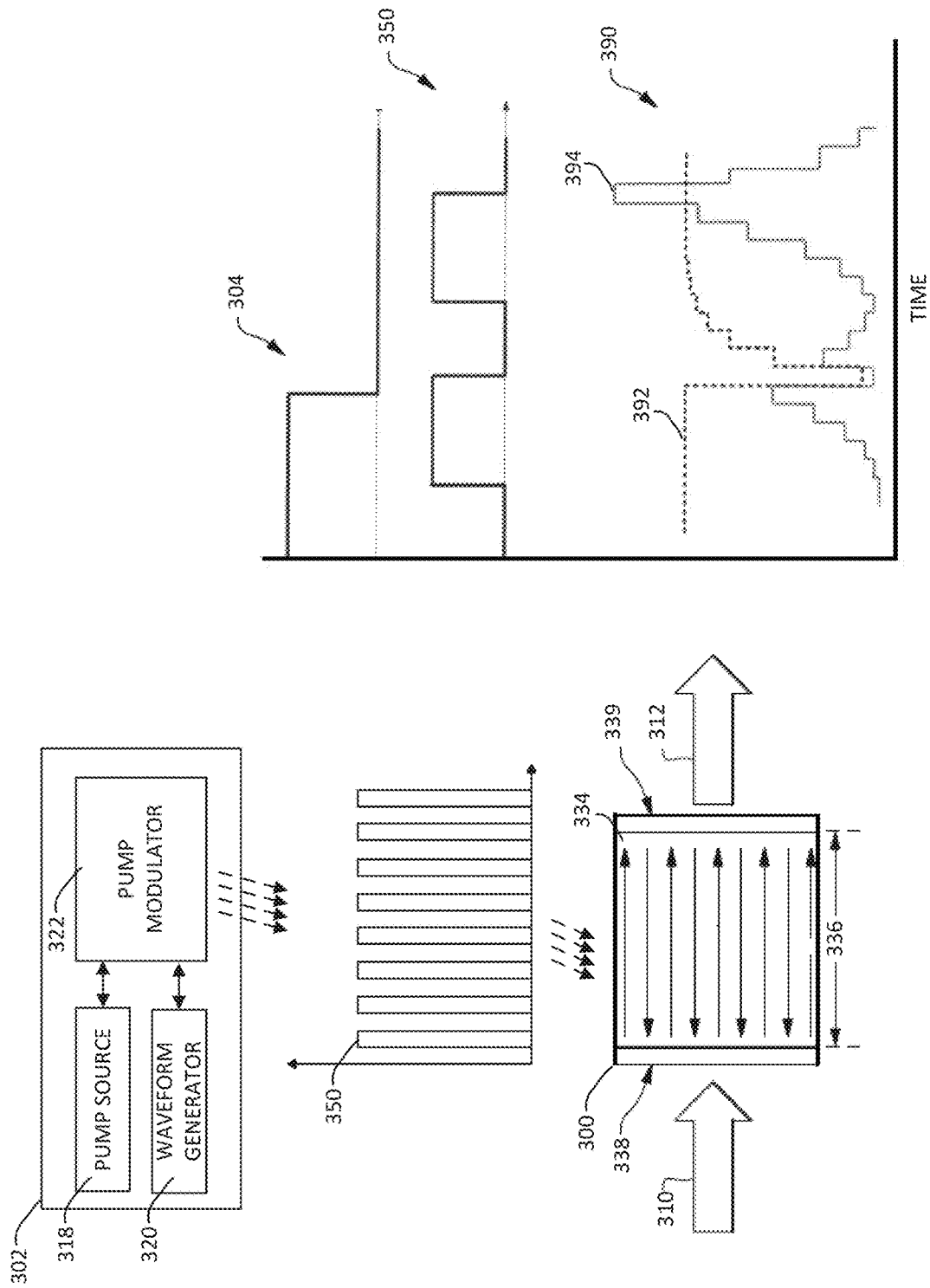
FIG. 3D is another illustration of the optical resonator and pump assembly of FIG. 3A, including a graph of output intensity of the optical resonator, according to various examples described herein.

As described, in some examples the encoded pump signal 360 may include a pulsed pump signal. FIG. 3C and FIG. 3D illustrate examples of the pump assembly 302 of FIG. 3A providing a pulsed pump signal 350 to the optical medium 334. Specifically, FIGS. 3C and 3D illustrate an example plot of a pulsed pump signal 350, where the pulsed pump signal 350 is an optical beam continuously pulsed between a substantially zero amplitude value and a predetermined non-zero amplitude value at a constant rate of repetition. The particular pulse rate and pulse duration of the pulsed pump signal 350 may be specified by the modulation waveform provided to the pump modulator 320, for example.

It is appreciated, that in various examples the optical medium 334 may operate in more than one gain state based on the properties of the optical medium 334, the received optical signal 310, and the encoded pump signal 360 (e.g., pulsed pump signal 350 in FIG. 3C). For instance, the optical medium 334 may amplify the received optical signal 310 when the pulsed pump signal 350 is at the non-zero amplitude value, and may not amplify the optical signal 310 when at the zero amplitude value. In this regard, the pulsed pump signal 350 modulates a gain of the optical medium 334. In one example, the optical medium 334 operates in a low gain state when the gain is lower than the losses due to reflection coefficients and absorption within the optical medium 334. In such an example, when the gain is low, and the optical signal 310 is constantly received and unchanging, the optical resonator 300 may reach the steady-state condition. One example of such a condition is illustrated in FIG. 3C.

However, in other examples, the optical medium 334 may operate in a high gain state when the gain is larger than the losses due to reflection coefficients and absorption within the optical medium 334. If the optical signal 310 is received at a resonant wavelength during such a condition, the optical resonator 300 may go into a lasing mode (e.g., the steady-state condition is not reached). Such an example is illustrated in FIG. 3D.

Referring to FIG. 3C, the output power plot 380 illustrates two traces of the output optical signal energy intensity (as output power). As discussed above, the particular shape of the optical signal intensity is referred to as the intensity profile of the output optical signal energy 312. To illustrate the timing between the output power plot 380, the input phase plot 304, and the pulsed pump signal 350, the input phase plot 304 and the pulsed pump signal 350 are repeated on a shared timescale with the output power plot 380. The first trace 382 represents the output optical signal intensity when the optical medium 334 is not excited by the pulsed pump signal 350, and the second trace 384 represents the output optical signal intensity when the optical medium 334 is selectively excited by the pulsed pump signal 350. As demonstrated by a comparison of the first trace 382 and second trace 384, the pulsed pump signal 350 modifies the waveform shape of the output power plot 380 when the optical medium 334 is selectively excited. In particular, the output optical signal intensity may be a convolution of the pulsed pump signal 350 and a least a portion of the resonant optical signal energy emitted by the optical resonator 300, as shown in plot 384. In this manner, the pulsed pump signal 350 may be modulated to produce a desired waveform shape of the output optical signal energy 312.

Referring to FIG. 3D, similar to FIG. 3C, illustrated is an output power plot 390 of two traces of the output optical signal intensity (as output power). To illustrate the timing between the output power plot 390, the input phase plot 304, and the pulsed pump signal 350, the input phase plot 304 and the pulsed pump signal 350 are repeated on a shared timescale with the output power plot 390. The first trace 392 represents the output optical signal intensity when the optical medium 334 is not excited by the pulsed pump signal 350. The second trace 394 represents the output optical signal intensity when the optical medium 334 is selectively excited by the pulsed pump signal 350.

Figure 4:
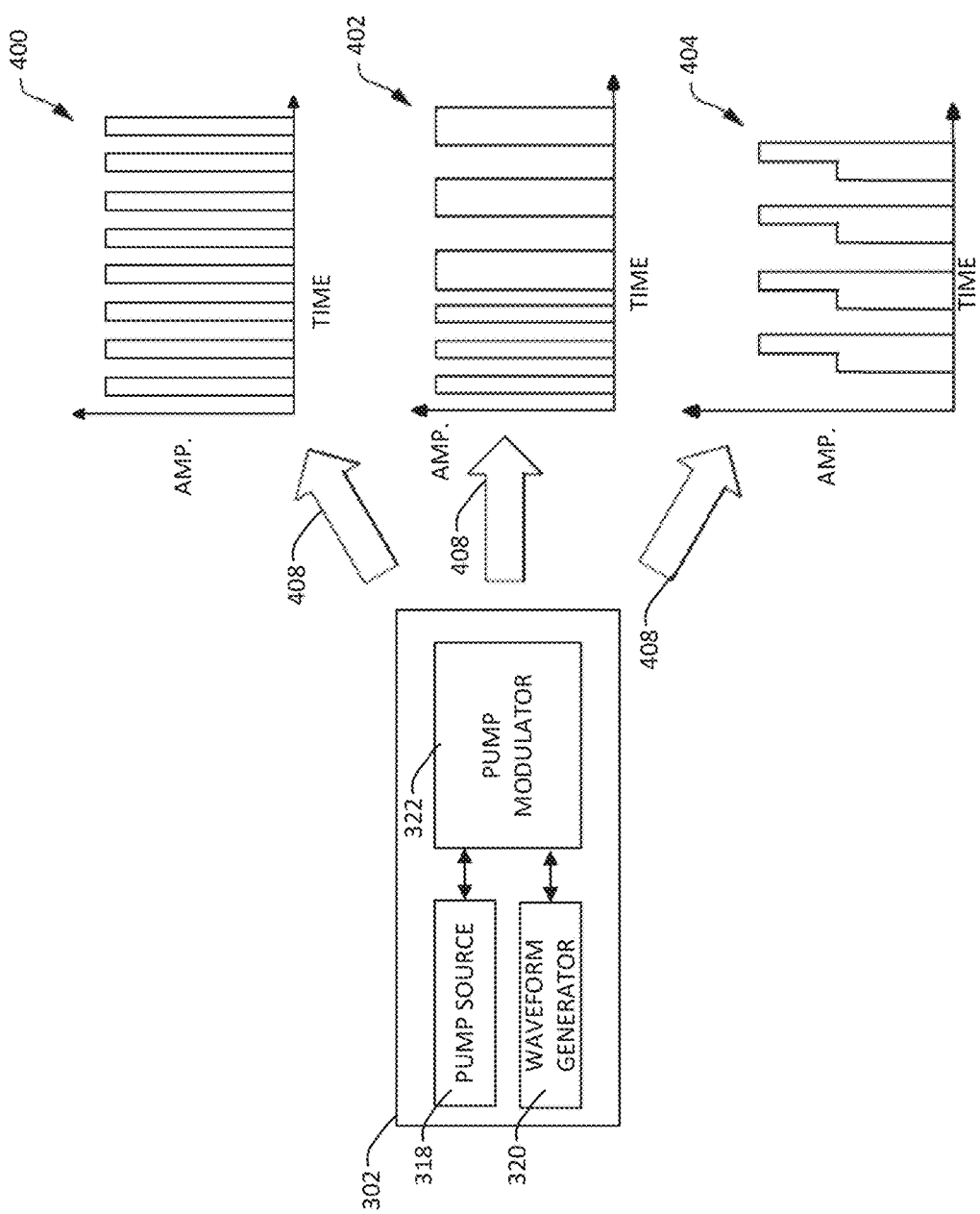
FIG. 4 is an illustration of the pump assembly of FIG. 3A, including graphs of an encoded pump signal, according to various examples described herein.

As described herein, in various examples the pump assembly 302 may provide a variety of different encoded pump signals 360 to the optical medium 334 to modify a waveform shape of the output optical signal energy 312. While in some examples the encoded pump signal 360 may include a continuously pulsed pump signal that is pulsed at a constant pulse rate for a constant pulse duration, in other examples other encoded pump signals 360 may be used. FIG. 4 illustrates the pump assembly 302 of FIG. 3A providing three different examples of a pulsed pump signal 408. Each pulsed pump signal 408 is plotted along a horizontal axis that represents time, and a vertical axis that represents amplitude. The first plot 400 illustrates an example of a continuously pulsed pump signal that is pulsed at a constant pulse rate for a constant pulse duration. A second plot 402 illustrates an example of a continuously pulsed pump signal that is pulsed at a first constant pulse rate for a first duration, and a second pulse rate for a second duration. During the duration of the first pulse rate, the pulsed pump signal is pulsed at a first constant pulse duration, and during the duration of the second pulse rate, the pulsed pump signal is pulsed at a second constant pulse duration. As shown in the plot 402, in various examples the pump assembly 302 may dynamically adjust the encoded pump signal 360 during the operation of the pump assembly 302. As further shown in FIG. 4, a third plot 404 illustrates another example of a pulsed pump signal 408. In plot 404, the pulsed pump signal is first pulsed to a first amplitude level, and secondly pulsed to a second amplitude level that is greater than the first amplitude level. In this example, the encoded pump signal is pulsed in a "step" function. While FIG. 4 illustrates three examples of encoded pump signals, other modulation techniques may be used.

Optical resonators, such as etalons, used to demodulate or convert optical signal modulations into intensity modulated output signals, as discussed herein, may be manufactured with significant aperture area to receive light signals, and may receive and operate on received light across a large aperture, such that portions of the light in one region of the aperture area may have varying phase relationship to other portions of the light received at other regions of the aperture area. The portions of light received at various regions may be operated on by the etalon essentially independently of each other. Light received at a first region of the etalon's aperture may be converted to intensity variations at an associated first output region, and light received at a second region of the aperture may be independently converted to intensity variations at an associated second output region, without interaction of the relative phases of the light arriving at each region. Accordingly, wavefront correction may not be required. Phase or other variations in any number of differing regions of the etalon's aperture may be simultaneously detected and converted into output intensity modulations at each of a respective output region. Such may be beneficial when the optical signal arriving at a receiver has propagated through a medium that causes wavefront variation.

Figure 5:
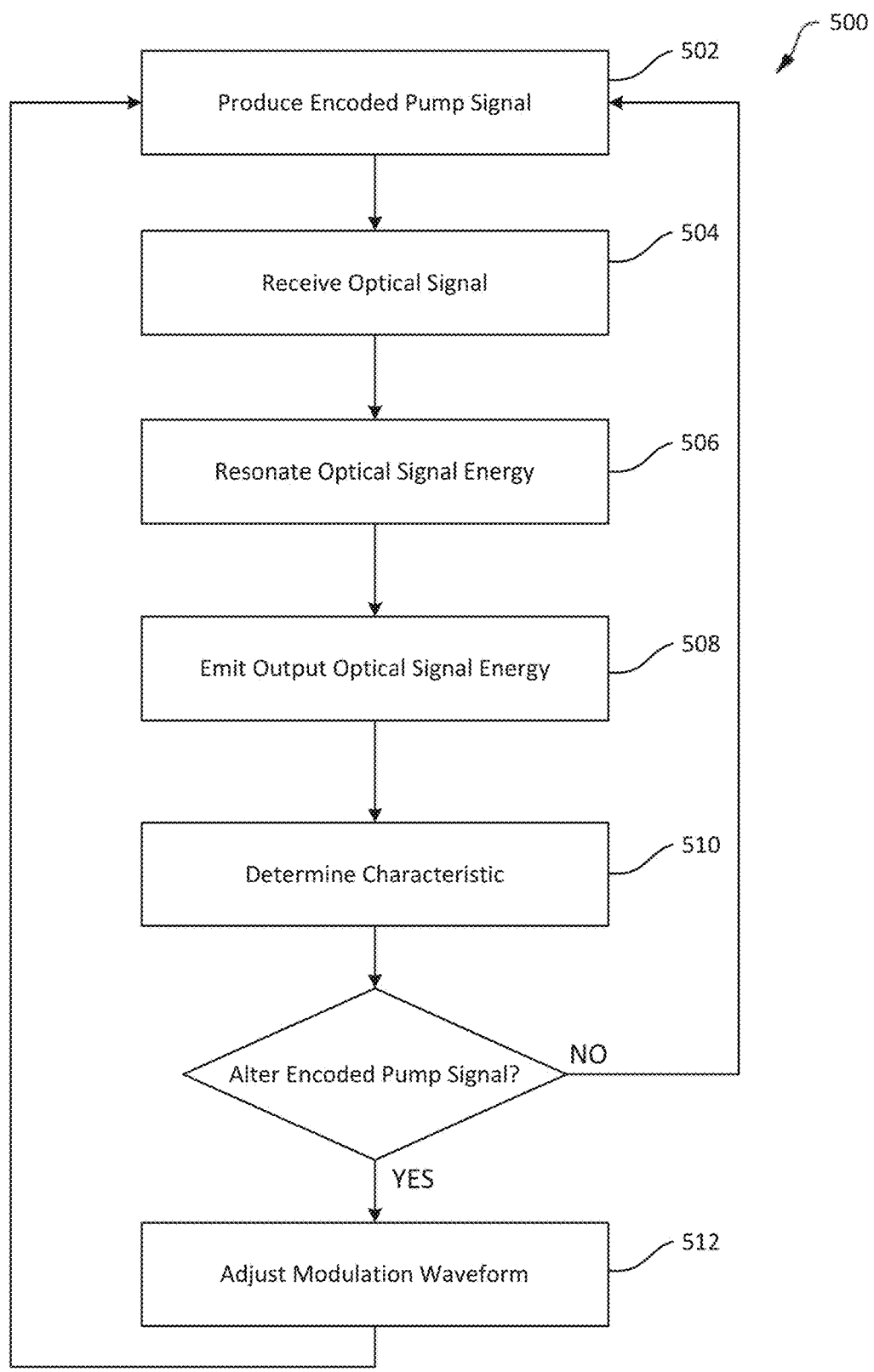
FIG. 5 is a process flow of a method for operating an optical signal receiver, according to various examples described herein.

As discussed above, various examples perform processes for optically demodulating a phase-encoded optical signal. In some examples, these processes are executed by an optical receiver, such as the optical receiver 200 described above with reference to FIG. 2. In particular examples, the optical receiver may include an optical resonator, such as the optical resonator 300 described with reference to FIG. 3. One example of a process for operating an optical receiver, such as the optical receiver 200, is illustrated in FIG. 5. FIG. 5 is described with continuing reference to the optical resonator 300 and pump assembly 302 illustrated in FIG. 3. In various examples, the process 500 may include producing an encoded pump signal, receiving an optical signal and the encoded pump signal at an optical resonator, accumulating resonant optical signal energy, emitting output optical signal energy, and determining a characteristic of a variation in the received optical signal. In some examples, the process 500 may also include adjusting one or more properties of the encoded pump signal.

In act 502, the process 500 may include encoding a modulation waveform on a pump signal to produce an encoded pump signal 360. As discussed above with reference to FIG. 3, in various examples the pump assembly 302 may include a pump source 318, a waveform generator 320, and a pump modulator 322. Accordingly, in act 502 the process 500 may include generating a pump signal at the pump source 318, generating a modulation waveform at the waveform generator 320, and encoding the modulation waveform on the pump signal to produce the encoded pump signal 360 at the pump modulator 322. While in some examples, act 502 may include generating a pulsed pump signal, in various other examples, the pump modulator 322 may phase, frequency, amplitude, or wavelength encode (e.g., modulate) the modulation waveform on the pump signal.

In act 504, the process 500 may include receiving the encoded pump signal 360 and an optical signal 310 at the optical resonator 300. In particular, the encoded pump signal 360 may be received at the optical medium 334 of the optical resonator 300 and the optical signal 310 may be received at a semi-reflective surface (e.g., first semi-reflective surface 338) of the optical resonator 300. For instance, the optical receiver 300 may receive an optical communication signal transmitted along a free space signal path (e.g., free space optical, FSO), a fiber coupling, or another waveguide system by the optical transmitter 100 of FIG. 1. As described herein, in some examples, the surfaces 338, 339 of the optical resonator 300 are semi-reflective and also semi-transmissive. Accordingly, in some examples, act 504 includes directing the received optical signal 310 into the optical resonator 300 (i.e., between the pair of semi-reflective surfaces 338, 339) with the first semi-reflective surface 338.

In act 506, the process 500 may include resonating optical signal energy within the optical medium 334 based at least in part on the received optical signal 310. In act 506, the process 500 may include accumulating resonant optical signal energy at the optical medium 334 interposed between the first semi-reflective surface 338 and the second semi-reflective surface 339 of the optical resonator 300. That is, in various examples, the arriving optical signal 310 allowed into the optical resonator 300 (i.e., between the pair of semi-reflective surfaces 338, 339) may resonate inside the optical resonator 300 and between the pair of semi-reflective surfaces 338, 339. As such, in act 506 the optical signal 310 received by the optical resonator 300 may establish a steady-state condition in which optical signal 310 continuously arrives at the optical resonator 300 and accumulates or adds to build-up resonating optical signal energy inside the optical resonator 300.

In act 508, the process 500 may include emitting output optical signal energy 312 from the optical resonator 300 and disturbing the output optical signal energy 312 in response to a variation in the received optical signal 310. In particular, an intensity of the output optical signal energy 312 may be based at least in part on an intensity of the accumulated resonant optical signal energy. That is, in various examples, at least a portion of the accumulated resonating optical signal energy inside the optical resonator 300 may be emitted from the optical resonator 300 at a constant rate (i.e., a steady-state output value). A variation in the arriving phase, frequency, or amplitude of the optical signal may disrupt the optical signal energy resonating inside the optical resonator 300, and, accordingly, disturb the output optical signal energy 312. As such, in act 508, the process 500 may include disturbing the intensity of the output optical signal energy in response to a variation in the received optical signal.

In various examples, the encoded pump signal 360 convolves with the resonating optical signal energy to modify a waveform shape of the output optical signal energy 312. As such, process 500 may include modulating a gain of the optical medium 334 with the encoded pump signal 360 to modify an intensity profile of the output optical signal energy 312. Various different modulation waveforms may be encoded on the pump signal to produce a desired intensity profile of the output optical signal energy 312. For instance, process 500 may include shaping the output optical signal energy (e.g., the intensity encoded output) to improve the detectability of the received optical signal 310, as well as, improve the detectability one or more variations (e.g., phase transitions) in the optical signal 310. In various other examples, the process 500 may include shaping the output optical signal energy 312 to perform one or more filtering operations, and/or perform pattern matching operations.

In act 510, the process 500 may include determining a characteristic of the variation in the received optical signal 310 based at least in part on the waveform shape of the output optical signal energy 312. As discussed herein, a change in phase, frequency, or amplitude of the arriving optical signal 310 causes a change in intensity of the emerging output optical signal energy 312. A large phase transition in the arriving optical signal 310, for example, causes a large (but temporary) intensity change in the emerging output optical signal energy 312. As such, in act 510, the process 500 may include detecting the disturbance in the intensity of the output optical signal energy 312. Such actions may be performed by a detector, such as a detector that includes an OEC, an analog to digital converter, and a digital processing subsystem. Specifically, the detector may process the disturbance in the intensity of the output optical signal energy 312 to receive the information-carrying content of the optical signal 310. Accordingly, the optical resonator 300 functions as a demodulator, or a modulation converter, for a received optical signal 310. That is, the emerging output optical signal energy 312 may therefore carry the same information content as the arriving optical signal 310, but in intensity modulated form.

As described, in various examples the particular properties of the encoded pump signal 360 may affect the waveform shape of the output optical signal energy 312. Accordingly, if the waveform shape of the output optical signal energy 312 is to be adjusted, the process 500 may proceed to act 512 in which the process 500 includes dynamically adjusting the encoded pump signal 360 to effect a change in the waveform shape of the output optical signal energy 312. In particular, act 512 may include adjusting the modulation waveform provided to the pump modulator 322 to alter a phase, frequency, amplitude, and/or wavelength of the encoded pump signal 312.

While not explicitly illustrated or described with reference to the process flow illustrated in FIG. 5, in various examples the process 500 may include additional acts or sub-acts. Such acts and sub-acts are described herein with reference to at least FIGS. 2, 3A, 3B, 3C, 3D, and 4.

Certain embodiments may incorporate various additional aspects or components to further provide selectivity of one light signal over another. For example, light of certain wavelengths may be preferred or rejected through the use of frequency selective filters, frequency selective coatings, and/or by selection of frequency selective dimensions or other features of an optical resonator or other resonant structures.

As discussed above with reference to at least FIGS. 1 and 2, in various examples components of the optical transmitter 100 and/or optical receiver 200 may be implemented as one of, or a combination of, analog circuitry, digital circuitry, or one or more digital signal processors (DSP) or other microprocessors executing software instructions. Software instructions may include DSP instructions. Various aspects and functions described herein may be implemented as specialized hardware or software components executing in one or more computer systems.

Figure 6:
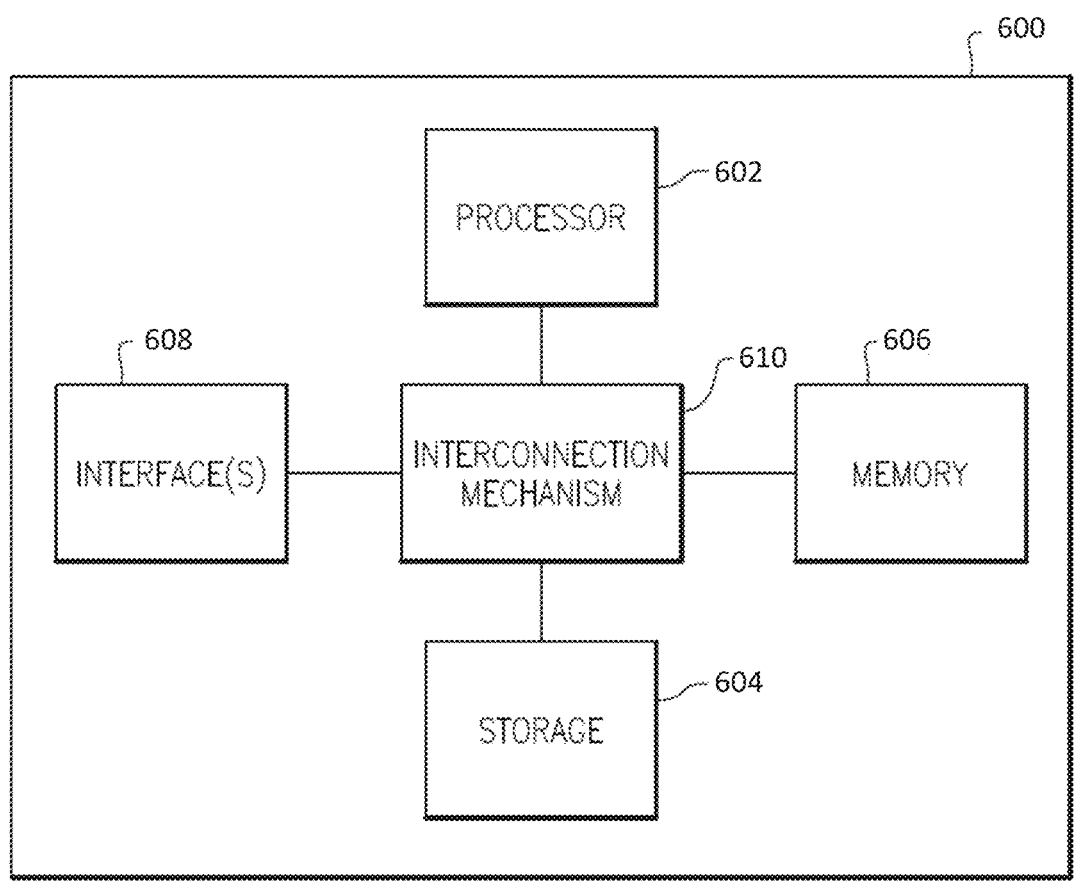
FIG. 6 is a functional block diagram of an example of a computing system that may be configured to implement various examples of the processes described herein.

FIG. 6 illustrates one example of a computing system 600 that may implement software routines corresponding to a control circuit or module, the FEC module 104, the spreading module 106, the mapping module 108, as illustrated in FIG. 1, and/or other components. The computing system 600 may further implement software routines corresponding to the correlator 252 and/or the code generator 254 associated with the digital processing subsystem 250 of FIG. 2 and/or other components of a receiver 200. The computing system 600 may include a processor 602, data storage 604, a memory 606, and one or more interfaces 608, such as a system interface and/or a user interface. While not explicitly illustrated in FIG. 6, in certain examples the computing system 600 may be coupled to a power source. The power source may deliver power to one or more components of the computing system 600, as well as other components of the optical transmitter 100 or optical receiver 200.

In FIG. 6, the processor 602 is coupled to the data storage 604, memory 606, and the various interfaces 608. The memory 606 stores programs (e.g., sequences of instructions coded to be executable by the processor 602) and data during operation of the computing system 600. Thus, the memory 606 may be a relatively high performance, volatile, random access memory such as a dynamic random access memory ("DRAM") or static memory ("SRAM"). However, the memory 606 may include any device for storing data, such as a disk drive or other nonvolatile storage device. Various examples may organize the memory 606 into particularized and, in some cases, unique structures to perform the functions disclosed herein. These data structures may be sized and organized to store values for particular data and types of data.

The data storage 604 includes a computer readable and writeable data storage medium configured to store nontransitory instructions and other data, and can include nonvolatile storage medium, such as optical or magnetic disk, ROM or flash memory. The instructions may include executable programs or other code that can be executed by the at least one processor 602 to perform any of the functions described herein.

In various examples, the computing system 600 includes several interface components 608, such as a system interface and/or a user interface. Each of the interface components 608 is configured to exchange, e.g., send or receive, data with other components of the computing system 600 (and/or associated transmitter or receiver), or other devices in communication with the computing system 600. According to various examples, the interface components 608 may include hardware components, software components, or a combination of hardware and software components.

In certain examples, components of the system interface couples the processor 602 to one or more other components of the optical transmitter 100 shown in FIG. 1, or of the optical receiver 200 shown in FIG. 2. The system interface may provide one or more control signals to any such components and may manage the operation of such components, as described above.

A user interface may include hardware and/or software components that allow a corresponding transmitter or receiver in which the computing system 600 is incorporated to communicate with an external entity, such as a user. These components may be configured to receive information from user interactions with the user interface. Examples of the components that may be employed within the user interface include buttons, switches, light-emitting diodes, touch screens, displays, stored audio signals, voice recognition, or an application on a computer-enabled device in communication with the computing system 600. Data received at the various interfaces may be provided to the processor 602, as illustrated in FIG. 6. Communication coupling (e.g., shown interconnection mechanism 610) between the processor 602, memory 606, data storage 604, and interface(s) 608 may be implemented as one or more physical busses in conformance with standard, proprietary, or specialized computing bus technologies.

The processor 602 performs a series of instructions that result in manipulated data that is stored in and retrieved from the data storage 604, as discussed above. In various examples, the series of instructions result in interpretation of the outputs from optical resonators as discussed above. Such instructions may correspond to commands for interpreting peaks and troughs of such output signals to determine phase, frequency, or amplitude changes (modulations) in an arriving optical signal, and/or recovering a data payload therefrom, as discussed herein.

The processor 602 may be any type of processor, multiprocessor or controller, whether commercially available or specially manufactured. For instance, the processor may include a commercially available processor, such as a processor manufactured by INTEL, AMD, MOTOROLA, or FREESCALE. In some examples, the processor 602 may be configured to execute an operating system, such as a real-time operating system (RTOS), for instance RTLinux, or a non-real time operating system, such as BSD or GNU/Linux. The operating system may provide platform services to application software. These platform services may include inter-process and network communication, file system management and standard database manipulation. One or more of many operating systems may be used, and examples are not limited to any particular operating system or operating system characteristic.

Portions of the disclosure herein make reference to orders of magnitude of distance, e.g., length, and time, e.g., duration, of aspects of light signals, with regard to the length or duration of a segment of light or a wavelength of light. It is to be understood that distance and duration may at times be used interchangeably with respect to light and optical systems, and unless the context implies otherwise, the relationship between distance and duration with respect to light is the speed of light in the medium of propagation. For example, phase relationships are on the order of one wavelength of light, and a wavelength is directly inversely proportional to frequency by the speed of light in the propagation medium. Similarly, segments of light generated by modulation of a light source are on the order of the segment length, which is directly inversely proportional to modulation rate by the speed of light in the propagation medium.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only.

What is claimed is:

1. An optical signal receiver comprising:
a pump assembly including a pump source coupled to a pump modulator, the pump source being configured to a emit a pump signal, and the pump modulator being configured to encode a modulation waveform on the pump signal to produce an encoded pump signal;
an optical resonator positioned to receive an optical signal and the encoded pump signal, the optical resonator including an optical medium to accumulate resonant optical signal energy inside the optical resonator based at least in part on the received optical signal, and the optical resonator being configured to emit output optical signal energy and to disturb the output optical signal energy in response to a variation in the received optical signal, wherein the optical medium is further configured to modify a waveform shape of the output optical signal energy based on the encoded pump signal; and
a detector configured to detect the output optical signal energy and to determine a characteristic of the variation in the received optical signal based on the waveform shape of the output optical signal energy.

2. The optical signal receiver of claim 1, wherein the output optical signal energy is a convolution of the encoded pump signal and at least a portion of the resonant optical signal energy.

3. The optical signal receiver of claim 2, wherein the disturbance in the output optical signal energy is a variation in an intensity of the output optical signal energy, and wherein the waveform shape of the output optical signal energy is an intensity profile.

4. The optical signal receiver of claim 3, wherein the optical medium is a gain medium configured to amplify the received optical signal, and wherein the pump modulator is further configured to produce the encoded pump signal to modulate a gain of the gain medium to modify the intensity profile of the output optical signal energy.

5. The optical signal receiver of claim 4, wherein the gain medium is formed from a non-linear crystal material or a semiconductor material.

6. The optical signal receiver of claim 1, wherein the pump source is, a continuous-wave laser, and wherein the pump assembly further includes a waveform generator configured to generate the modulation waveform.

7. The optical signal receiver of claim 6, wherein the waveform generator is further configured to dynamically adjust the modulation waveform to alter the encoded pump signal.

8. The optical signal receiver of claim 7, wherein the encoded pump signal is a pulsed pump signal.

9. The optical signal receiver of claim 1, wherein the optical resonator is an etalon having a pair of semi-reflective surfaces configured to at least partially trap the resonant optical signal energy between the pair of semi-reflective surfaces by reflecting a portion of resonant optical signal energy between pair of semi-reflective surfaces, the optical medium being interposed between the pair of semi-reflective surfaces.

10. The optical signal receiver of claim 9, wherein the optical resonator is configured to disturb the output optical signal energy in response to a variation in a phase of the received optical signal.

11. The optical signal receiver of claim 10, wherein the detector is further configured to identify the variation in the phase of the received optical signal based at least in part on the waveform shape of the output optical signal energy.

12. A method of operating an optical signal receiver, the method comprising:
encoding a modulation waveform on a pump signal to produce an encoded pump signal;
receiving the encoded pump signal and an optical signal at an optical resonator, the optical resonator including an optical medium;
resonating optical signal energy within the optical medium based at least in part on the received optical signal;
emitting output optical signal energy from the optical resonator and disturbing the output optical signal energy in response to a variation in the received optical signal, wherein the encoded pump signal convolves with the resonating optical signal energy to modify a waveform shape of the output optical signal energy; and
determining a characteristic of the variation in the received optical signal based at least in part on the waveform shape of the output optical signal energy.

13. The method of claim 12, wherein the disturbance in the output optical signal energy is a variation in an intensity of the output optical signal energy, and wherein the waveform shape of the output optical signal energy is an intensity profile.

14. The method of claim 13, further comprising amplifying the received optical signal at the optical medium.

15. The method of claim 14, further comprising modulating a gain of the optical medium with the encoded pump signal to modify the intensity profile of the output optical signal energy.

16. The method of claim 12, further comprising:
generating the pump signal at a continuous-wave laser;
generating the modulation waveform at a waveform generator; and
dynamically adjusting the modulation waveform to alter the encoded pump signal.

17. The method of claim 16, wherein the encoded pump signal is a pulsed pump signal.

18. The method of claim 12, wherein resonating optical signal energy within the optical medium includes trapping the optical signal energy between a pair of semi-reflective surfaces by reflecting a portion of optical signal energy between the pair of semi-reflective surfaces.

19. The method of claim 18, wherein the variation in the received optical signal is a variation in a phase of the received optical signal.

* * * * *